Aug. 6, 1929.  G. C. WATERS, JR  1,723,715
SPRAYING DEVICE
Filed March 30, 1928
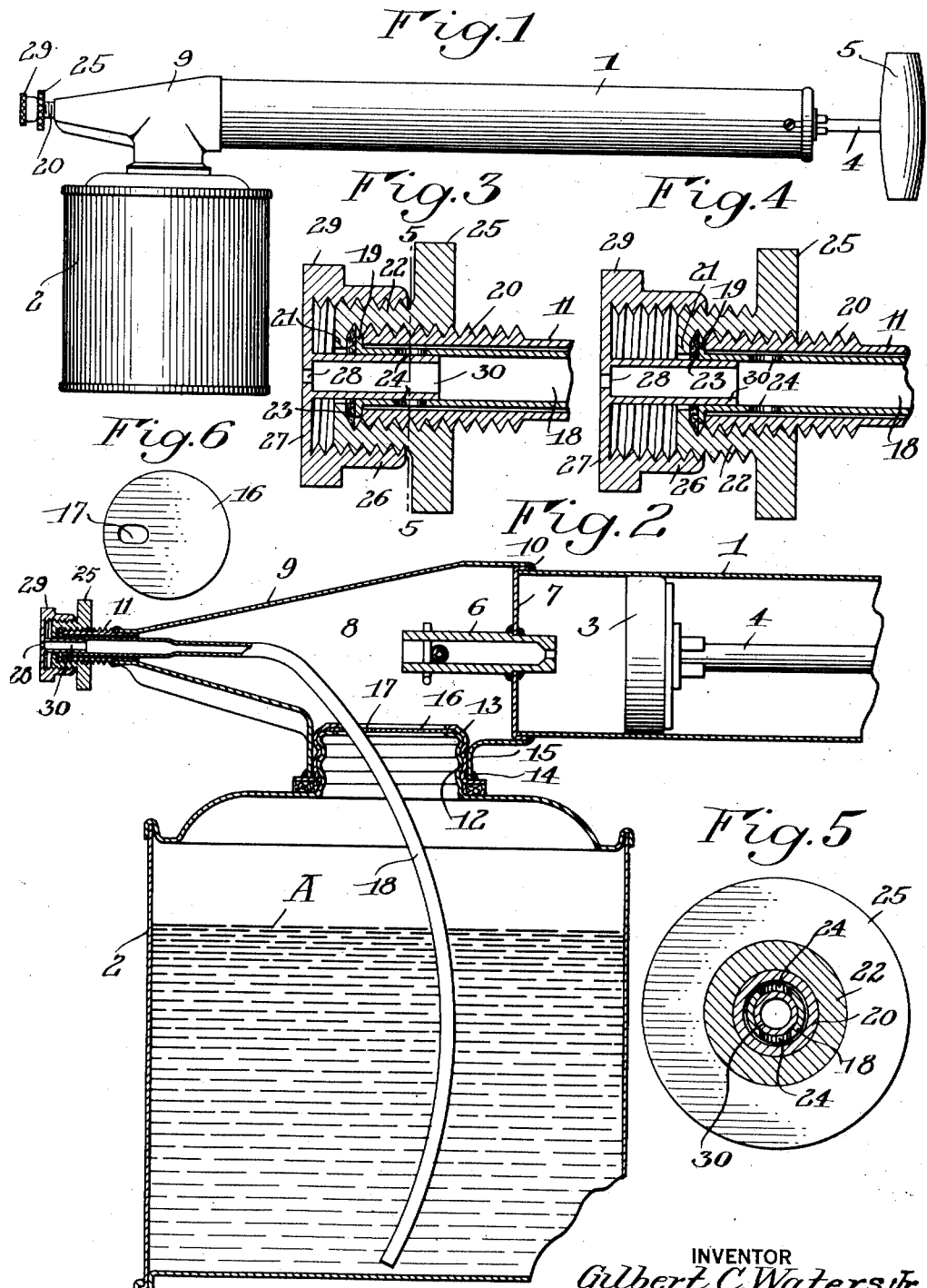
INVENTOR
Gilbert C. Waters, Jr.
BY
his ATTORNEYS Patented Aug. 6, 1929.

1,723,715

UNITED STATES PATENT OFFICE.

GILBERT C. WATERS, JR., OF ROCHESTER, NEW YORK, ASSIGNOR TO THE E. C. BROWN COMPANY, OF ROCHESTER, NEW YORK, A CORPORATION OF NEW YORK.

SPRAYING DEVICE.

Application filed March 30, 1928. Serial No. 266,058.

My present invention relates to spraying and atomizing apparatus, and more particularly to means for regulating the quality of the spray delivered from a pump or spraying device of the nature used generally for the purpose of spraying liquids upon plants, or exterminating flies and other vermin. The improvements are directed in general toward providing a cheap and efficient mounting for the siphon or atomizing tube and toward the provision of arrangements, whereby the emissions of air and liquid from the tube may be nicely regulated.

To these and other ends the invention resides in certain improvements and combinations of parts, all as will hereinafter be more fully described, the novel features being pointed out in the claims at the end of the specification.

In the drawings:

Figure 1 is a side view of a spraying device constructed in accordance with and illustrating one embodiment of my invention;

Figure 2 is an enlarged fragmentary central longitudinal vertical section through the forward portion of the device;

Figure 3 is an enlargement of the section through the nozzle as shown in Fig. 2;

Figure 4 is a section similar to Fig. 3 but showing the parts in different positions of adjustment;

Figure 5 is a section on the line 5—5 of Fig. 3, and

Figure 6 is a detail plan view of an air baffle.

Similar reference numerals throughout the several views indicate the same parts.

For the purposes of illustration I have shown as an embodiment of my invention a small hand sprayer of the familiar type embodying as major element an air pump cylinder 1 and a liquid container or tank 2. A piston 3 reciprocates in the cylinder 1, being connected by the piston rod 4 with an exterior handle 5, as usual. The operator holds the device by means of the cylinder with one hand, and operates the piston with the other, the tank 2 being in suspended relationship. As the air pressure is developed in the cylinder, it is forced through a check valve tube 6, preferably soldered in the head 7 of the cylinder, as clearly shown in Fig. 2.

This pumping action builds up sustained pressure in a pressure chamber 8 formed by a tapered casing 9 soldered or otherwise secured at its rear end to the cylinder head 7 and cylinder 1, as indicated at 10, and having its forward end terminating in a threaded air tube 11, which may also be made as a separate part, and soldered into position as shown. The tank 2 is provided with the usual threaded plug collar 12 that is normally closed by a threaded cap, but when this cap is removed the tank may be attached to the pressure casing 9, and become a part of the present device by being screwed into an interiorly threaded collar or socket member 13 soldered at 14 within a collar 15 formed on the lower side of the casing 9. A baffle plate 16 is preferably interposed and held between the two threaded members for a purpose hereinafter explained, the same being provided as shown in Fig. 6 with an elongated opening 17.

A curved liquid tube 18 extends through the opening 17 in the baffle plate 16, occupying both the air pressure chamber 8 and having its lower end extending to the bottom of the body of liquid A in the tank 2. Its upper end extends through the air tube 11 without completely filling or obstructing it to produce an atomizing relationship with air escaping through this tube from the pressure chamber 8, which relationship is maintained as follows: The outer end of the liquid tube is provided with a flange or shoulder 19 which abuts against the end of a threaded enlargement 20 on the projecting portion of the air tube 11. It is held there by an inturned shoulder 21 on a nut 22 threaded upon the enlargement 20 with a suitable packing material 23 preferably interposed. The liquid tube is inserted from the exterior. A short distance back from its shouldered tip aforesaid the liquid tube is provided with lateral openings 24 which establishes an atomizing action. The air under pressure from the chamber 8 escapes around the liquid tube through the air tube 10 and entering these openings 24 escapes through the end of the liquid tube and forcibly draws the liquid with it from the tank.

At this point it may be explained that air from the pressure chamber 8 passes through the perforation 17 of the baffle 16 into the tank 2 above the body of liquid A and also tends to force the liquid up through the tube 18. It might seem at first glance that this forced feed would not occur because the same air from pressure chamber 8 has access to the upper end of the tube also at 24, and therefore these pressures should counteract and equalize. Such, however, is not the case because of the reduction in pressure as the air passes through the narrow passage in the air tube 11 afforded between the interior of the air tube and the exterior of the liquid tube. Furthermore, when the pressure of the air is further reduced by passage through the opening 24, its velocity is nevertheless increased. In the meantime the compressed air in chamber 8 in passing through the restricted opening 17 in the baffle 16 to the tank 2 does not discharge into the latter in such quantity as to build up too much pressure on the surface of the liquid, and thereby force an inordinate quantity through the liquid tube to the atomizing point.

Returning to this atomizing or discharge end of the sprayer where my invention principally resides, the before mentioned securing nut 22 for the end of the liquid tube 18 is provided with an enlarged knurled portion 25 for making it convenient to turn it with the fingers, and also to hold it against turning with the fingers. The nut is exteriorly threaded to receive the interiorly threaded sleeve 26 of a nozzle element 27 having a small discharge orifice 28 centrally located in its end face or head. This nozzle also has a large knurled portion 29 by means of which it can be screwed in and out on the clamping nut 22. The discharge orifice 28 is in axial alignment with the tubes 11 and 18 and is surrounded on the interior by a rearwardly projecting valve tube 30, which substantially fits the bore of the liquid tube 18, the portion of which latter within the air tube 11 is straight. Its purpose is to regulate the amount of air escaping through the openings 24 from the air tube 11 into the liquid tube 18. As the nozzle element is turned and travels back and forth on the threads of the nut 22, the valve tube 30 slides or telescopes back and forth in the liquid tube 18 and is capable of assuming the extreme closed position of Fig. 3 in which the air is entirely cut off, and the extreme open position of Fig. 4 in which the air openings 24 are unobstructed, and have full capacity. The nature and volume of the atomized spray can thus be regulated to a nicety in a convenient manner.

The adjustments of the nozzle element 27 on the nut 22 being made loose or reasonably free in the turning movement do not ordinarily tend to loosen or dislodge the more tightly threaded clamping nut, but in any event the latter can be held in place during such adjustments by the knurled portion 25.

I claim as my invention:

1. In a spraying device, the combination with an outer air tube, an inner liquid tube projecting therefrom, and provided with lateral atomizing openings near its mouth, and means for supplying air and liquid under pressure to said tubes, respectively, of means for regulating the escape of air from the air tube into the liquid tube through said atomizing openings.

2. In a spraying device, the combination with an outer air tube, an inner liquid tube projecting therefrom, and provided with lateral atomizing openings near its mouth, and means for supplying air and liquid under pressure to said tubes, respectively, of a sliding valve element within the liquid tube adapted to regulate the escape of air from the air tube into the liquid tube through said atomizing openings.

3. In a spraying device, the combination with an outer air tube, an inner liquid tube projecting therefrom, and provided with lateral atomizing openings near its mouth, and means for supplying air and liquid under pressure to said tubes, respectively, of a nozzle having a discharge orifice and inner surrounding valve tube fitting within the liquid tube and adjustable to regulate the escape of air from the air tube into the liquid tube through said atomizing openings.

4. In a spraying device, the combination with an outer air tube, an inner liquid tube projecting therefrom, and provided with lateral atomizing openings near its mouth, and means for supplying air and liquid under pressure to said tubes, respectively, of a nozzle having a threaded mounting on the air tube, said nozzle being provided with a discharge orifice and with an inner surrounding valve tube fitting within the liquid tube and adapted, when the nozzle is rotated, to regulate the escape of air from the air tube into the liquid tube through said atomizing openings.

5. In a spraying device, the combination with an outer exteriorly threaded air tube and an inner liquid tube projecting therefrom and provided at its tip with a flanged shoulder engaging the end of the air tube and means for supplying air and liquid under pressure to said tubes, respectively, of an exteriorly threaded nut interiorly threaded on the air tube and provided with an internal shoulder engaging the tip of the liquid tube to clamp it against the end of the air tube and hold the liquid tube in place, said liquid tube being provided near its tip with lateral openings communicating with the air tube, and a nozzle threaded on the nut and provided with a central orifice and an internal projecting valve tube surrounding the orifice and fitting within the liquid tube to regulate the capacity of the said lateral openings as the nozzle is rotated.

GILBERT C. WATERS, Jr.